United States Patent [19]

Lee et al.

[11] 4,390,673

[45] Jun. 28, 1983

[54] PROCESS FOR PRODUCING SUBSTANTIALLY GEL-FREE BUTADIENE-ISOBUTYLENE COPOLYMERS UTILIZING A BF$_3$/ROH CATALYST SYSTEM

[75] Inventors: Kang I. Lee, Framingham, Mass.; James Oziomek, Akron, Ohio

[73] Assignee: The Firestone Tire & Rubber Company, Akron, Ohio

[21] Appl. No.: 301,482

[22] Filed: Sep. 11, 1981

[51] Int. Cl.$^3$ ................................................. C08F 4/14
[52] U.S. Cl. ...................................... 526/212; 526/237
[58] Field of Search ....................... 526/211, 212, 237

[56] References Cited

U.S. PATENT DOCUMENTS

| | | | |
|---|---|---|---|
| 2,423,760 | 7/1947 | Elmore | 526/212 |
| 2,607,764 | 8/1952 | Nelson | 526/237 |
| 2,901,471 | 8/1959 | Pavlick | 526/212 |

*Primary Examiner*—Paul R. Michl

[57] ABSTRACT

The invention relates to a process for producing substantially gel-free copolymers of butadiene and isobutylene having number average molecular weights of from about 50,000 to about 200,000 and levels of unsaturation of from about 3 weight percent to about 25 weight percent. The process which is homogeneous in nature involves polymerizing the monomers in an aliphatic solvent or mixture of such solvents in the presence of a BF$_3$/ROH catalyst system at a temperature of below $-95°$ C.

14 Claims, No Drawings

PROCESS FOR PRODUCING SUBSTANTIALLY GEL-FREE BUTADIENE-ISOBUTYLENE COPOLYMERS UTILIZING A BF$_3$/ROH CATALYST SYSTEM

BACKGROUND OF THE INVENTION

The present invention relates to a process for preparing substantially gel-free copolymers of 1,3-butadiene and isobutylene. More particularly, the invention relates to a homogeneous process for preparing such copolymers, utilizing a catalyst system consisting of BF$_3$ and ROH (defined hereinafter).

Copolymers of the type embodied in this invention are commonly referred to in the prior art as butyl rubbers. This term generally refers to copolymers prepared by the polymerization of isobutylene with a conjugated diene. Early processes for preparing such copolymers generally resulted in the production of copolymers having low levels of unsaturation, i.e., 1.5 mole percent or less. In addition, at higher unsaturation levels these early copolymers often exhibited a low number average molecular weight and in many instances a very high gel content.

Thus, U.S. Pat. No. 2,607,764 to Nelson is directed to a copolymer of isobutylene and butadiene which is prepared by polymerizing a mixture of butadiene and isobutylene, in a ratio of butadiene to isobutylene of between 2 to 10 or 12 times as much butadiene as isobutylene, in a halo-substituted aliphatic, carbon disulfide or low-freezing hydrocarbon solvent using a Friedel-Crafts catalyst such as a metal halide, e.g., aluminum chloride at a temperature below −6° C. The patent discloses that the preferred polymerization temperature lies below −6° C. and preferably within the range between about −40° C. and −103° to −110° C. but may be as low as −164° C. However, the patent indicates a number of the copolymers described therein contain significant amounts of gel as shown in Example 2, Table III at column 11 of the patent wherein it is disclosed that isobutylene-butadiene copolymers of high unsaturation are not completely soluble in hydrocarbons.

U.S. Pat. No. 2,844,569 to Green et al describes a process for preparing copolymers of diolefin, including butadiene, and isobutylene which involves polymerizing the monomer in a saturated hydrocarbon solvent at a polymerization temperature of from 0° C. to −164° C., preferably from −35° C. to −103° C., in the presence of a Friedel-Crafts catalyst dissolved in a low-freezing, non-complex forming solvent. Friedel-Crafts catalysts which are disclosed include among others aluminum chloride and boron trifluoride. However, applicants have found that the use of BF$_3$ as the sole catalyst in a very dry polymerization system is not very effective, often resulting in low yields or lengthy polymerization times. In addition, the patent at column 4, lines 47–49 states that use of lower alcohols in the polymerization system should be avoided on the grounds that such alcohols are not solvents for the polymer and also react with the catalyst.

U.S. Pat. No. 2,775,537 to Wilson is directed to cements for bonding together dissimilar polymers. The cements are prepared by polymerization of isobutylene and a diolefin including butadiene utilizing a Friedel-Crafts catalyst. However, the patent indicates that the resulting copolymers have low molecular weights or have high levels of gel.

U.S. Pat. No. 3,466,268 to Barton et al and its parent counterpart U.S. Pat. No. 3,357,960 discloses butadiene-isobutylene copolymers and a method for their preparation. The invention disclosed in these references is directed to a method of improving butadiene polymers by incorporating varying amounts of isobutylene in the polymer. Preferably, the amount of isobutylene incorporated is said to be about 2 to 40 weight percent. However, the copolymers disclosed therein are low in number average molecular weight.

More recently, attempts have been made in the prior art to produce substantially gel-free copolymers of isoolefins and conjugated dienes having a mole percent unsaturation of at least 5% and a number average molecular weight of at least 120,000.

Thus, for example, U.S. Pat. No. 3,928,297 to Thaler et al describes the preparation of such copolymers by a process which involves the polymerization of the monomers in not more than 40 weight percent of a cosolvent which is a solvent for the polymer at the polymerization temperature in the presence of a metal halide (e.g., aluminum chloride) at a temperature of less than −100° C. The catalyst is introduced into the reaction zone in a polar solvent. The patent specifically excludes the use of butadiene.

U.S. Pat. No. 3,856,763 to Thaler et al describes the preparation of such copolymers using a homogeneous polymerization system featuring a hydrocarbyl aluminum dihalide catalyst. The reaction is carried out in a solvent mixture consisting of paraffinic solvents at a temperature of −100° C. Again, the patent excludes butadiene.

U.S. Pat. No. 3,808,177 at Thaler et al describes a similar process for producing such copolymers in which the catalyst is an aluminum halide and the reaction is carried out in a solvent medium consisting of a polar solvent, e.g., a halogenated aliphatic hydrocarbon and a cosolvent consisting of a paraffinic hydrocarbon such as pentane, isopentane, cyclohexane, heptane, etc. Again, butadiene is specifically excluded.

SUMMARY OF THE INVENTION

In accordance with the present invention, a process for producing substantially gel-free copolymers of butadiene and isobutylene having a number average molecular weight of from about 50,000 to about 200,000 and a degree of unsaturation of from about 3 to about 25 weight percent (based on the weight percent of butadiene incorporated in the copolymer) is provided. As is evident to those skilled in the art, copolymers of butadiene and isobutylene having high molecular weights generally have low degrees of unsaturation while those having low molecular weights have high degrees of unsaturation.

The process involves first preparing a reaction mixture by dissolving from 50 to 80 mole percent of 1,3-butadiene and from 50 to 20 mole percent of isobutylene in an aliphatic hydrocarbon solvent or a mixture of aliphatic hydrocarbon solvents. Then, the monomers in the reaction mixture are polymerized at a temperature of below −95° C. in the presence of a catalyst system consisting of a BF$_3$ catalyst and an ROH cocatalyst wherein R is an organic radical selected from the group consisting of alkyl, cycloalkyl, substituted alkyl, aryl and substituted aryl groups. The alkyl groups may contain from 1 to 20 carbon atoms and the molar ratio of BF$_3$ to ROH in the catalyst system is from about 1:1 to about 22:1. The polymerization reaction is then terminated by the addition of excess alcohol and the copolymer recovered by coagulation in conventional manner and dried as described below.

The process of the invention is a homogeneous process which permits the production of copolymers having a degree of unsaturation ranging from about 3 weight percent to about 25 weight percent and number average molecular weights ranging from about 50,000 to about 200,000.

The resultant copolymers may be utilized in a variety of applications where butyl rubbers are commonly employed. Thus, these copolymers may be utilized as butyl inner liners for tires, bushings, shock dampening articles and the like.

DETAILED DESCRIPTION OF THE INVENTION

As indicated, copolymers prepared by the process of the invention may have number average molecular weights of from about 50,000 to about 200,000 and unsaturation levels of from about 3 to about 25 weight percent.

The molecular weight of the butadiene-isobutylene copolymer generally varies with the amount of butadiene monomer, the amount of catalyst or catalyst system, the degree of conversion and the like. Preferred copolymers are those having number average molecular weights of 70,000 or above. Especially preferred copolymers are those having number average molecular weights of 100,000.

The unsaturation level of the butadiene-isobutylene copolymer generally varies with the amount of butadiene monomer, the amount of catalyst or catalyst system, the temperature and the like. Preferred copolymers are those having an unsaturation level of at least 6 weight percent. Especially preferred copolymers are those having unsaturation levels of from 6 to 12 weight percent.

The first step in the process of the invention involves the preparation of a reaction mixture by dissolving from 50 to 80 mole percent of 1,3-butadiene and from 50 to 20 mole percent of isobutylene in an aliphatic hydrocarbon solvent or a mixture of aliphatic hydrocarbon solvents.

The precise method of preparing the reaction mixture can be varied somewhat. Thus, for example, the monomers and solvent or solvent mixtures can be charged to the reactor in a single charge. Alternatively, the solvent or solvent mixture can first be charged to the reactor followed by addition of the monomers. This can be done at room temperature, and then the reactor can be cooled to polymerization temperatures, following which the catalysts are added. Alternatively, the reactor can first be cooled to about the polymerization temperature and then the monomers, solvent and catalyst system can be added.

Suitable aliphatic hydrocarbon solvents which may be employed in the reaction mixture include hexane, pentane, heptane, isopentane, isohexane and the like. The basic criteria for the selection of the aliphatic hydrocarbon solvent is that it alone or it in combination with the monomers has a low enough freezing temperature to remain a liquid at the polymerization temperature employed. The preferred aliphatic hydrocarbon solvent for use in the process of this invention is hexane. Mixtures of aliphatic and cycloaliphatic hydrocarbon solvents may also be employed and are often preferred. Cycloaliphatic hydrocarbon solvents which may be utilized include methyl cyclohexane, methyl cyclopentane, cyclohexane, cyclopentane and the like. In instances where mixtures of aliphatic and cycloaliphatic hydrocarbon solvents are utilized, they may be present in a volume ratio of linear or branched aliphatic hydrocarbon solvent to cycloaliphatic hydrocarbon solvent of from 1:4 to 4:1. The preferred volume ratio is 1:1. The preferred mixture is a mixture of hexane and cyclohexane. It should again be noted that as in the case where a single solvent is employed, the specific mixture of aliphatic and cycloaliphatic hydrocarbon solvent is selected such that the solvents alone or in combination with the monomers have a sufficiently low freezing point to remain liquid at the polymerization temperature.

As mentioned above, the next step in the process involves polymerization of the monomers in the presence of the $BF_3$/ROH catalyst combination at a temperature of below $-95°$ C. The particular polymerization conditions, i.e., temperatures and times, are dependent on several factors including the level of butadiene in the monomer charge, the catalyst level, the degree of conversion desired and the like. In general, polymerization temperatures may range from $-95°$ C. to $-120°$ C. or to the freezing point with the preferred polymerization temperature being $-110°$ C.

The polymerization times may vary considerably depending on factors such as the polymerization temperature, the level of butadiene in the monomer charge, the catalyst level, the degree of conversion desired and the like. In general, polymerization times may range from 15 minutes to 5 hours with the preferred times being from 1 to 2 hours.

The monomers are polymerized in the presence of a catalyst system consisting of a $BF_3$ catalyst and ROH cocatalyst. In the ROH cocatalyst, R is an organic radical selected from the group consisting of alkyl, cycloalkyl, substituted alkyl, aryl and substituted aryl groups. The alkyl groups in the above alcohol may contain from 1 to 20 carbon atoms. In general, the alcohol cocatalyst may be any aliphatic, cycloaliphatic, substituted aliphatic, aromatic, or substituted aromatic alcohol.

Suitable examples of aliphatic alcohols which may be employed include alkanols such as methanol, ethanol, n-propanol, isopropanol, n-butanol, sec-butanol, t-butanol, hexanol, octanol, and the like. Suitable cycloaliphatic alcohols which may be employed include cyclohexanol, cyclopentanol, and the like. Substituted aliphatic alcohols which may be employed include halogen-substituted alcohols such as the fluoroalcohols, including trifluoroethanol, trifluorobutanol and the like.

Various aromatic alcohols may be utilized such as phenol, naphthol, and the like. Substituted aromatic alcohols may also be employed in some instances. However, when using such alcohols, care must be taken to avoid the use of highly substituted aromatic alcohols. The reason for this is that the highly substituted aromatic alcohols may exhibit steric hindrance characteristics which would interfere with their ability to function as cocatalysts in the catalyst system of the invention. In other words, substituted aromatic alcohols which are sterically hindered should be avoided. Suitable substituted aromatic alcohols which may be employed include the cresols and the like. The preferred alcohols for use as a cocatalyst in the process of the invention are the aliphatic alcohols in which R in the formula ROH is an alkyl or substituted alkyl radical containing from 1 to 10 carbon atoms.

Total amounts of catalyst and cocatalyst employed in the polymerization process may vary considerably depending upon the specific monomer charge, the polymerization temperature and the degree of conversion desired. In general, subject to the above considerations, amounts of catalyst and cocatalyst which are effective to achieve a conversion level of monomer to polymer of from about 1 to about 20 percent by weight solids are sufficient. If desired, the amounts of catalyst can be based on the amount of alcohol cocatalyst employed in the polymerization reaction. Thus, for example, amounts of alcohol cocatalyst utilized in the reaction may range from 0.001 millimole to 0.5 millimole per 100 milliliters of monomers as the butadiene monomer content in the monomer mixture is increased from 50 to 80 mole percent. The amounts of $BF_3$ catalyst employed in combination with the alcohol can then be determined from the molar ratios of $BF_3$ to ROH set forth below bearing in mind factors such as monomer charge, polymerization temperature, desired degree of conversion and the like. The determination of the total amounts of catalyst combination to be employed in the polymerization reaction can readily be made by routine experimentation by those skilled in the polymerization art.

The molar ratio of $BF_3$ to ROH can vary considerably depending on the factors set forth above. Thus, the molar ratio of $BF_3$ to ROH can range from about 1:1 to about 22:1 with the preferred molar ratio being about 3:1.

Following polymerization of the monomers to obtain a copolymer having the desired properties, the reaction can be terminated by the addition of excess alcohol (e.g., about 3 milliliters). The copolymer can then be recovered from solution by any conventional method such as, for example, coagulation in methanol and then dried under vacuum.

The reactions in the examples which follow were conducted in a large stainless steel enclosure supplied with an inert atmosphere of dry nitrogen gas. In the bottom of the enclosure was a well equipped with coils and a solenoid to allow liquid nitrogen to flow through the coils when called for by a thermocouple placed in the well. During polymerization, a low freezing liquid was charged to the well, cooled by the liquid nitrogen and maintained at the desired temperature. The well was also equipped with a stirrer to help maintain a constant temperature to within $\pm 1°$ C.

A reaction vessel to conduct the reaction itself was immersed in the cold well liquid on a suitable support. The reaction vessel was also equipped with a mechanical stirrer, a thermocouple and a dip tube extending below the liquid level of the vessel. The dip tube was attached to a $BF_3$ cylinder through a precision electronic mass flow controller and a nitrogen cylinder through a rotameter flow monitor. $BF_3$ flow rates were 0.1 to 1 milliliter (ml) per minute while $N_2$ flow rates were about 100 ml per minute measured at room temperature. In conducting the polymerization experiments, the onset of polymerization could be determined by the observation of an exotherm of as little as 1° C.

The following examples are presented for the purpose of further illustrating the nature of the present invention and are not to be regarded as a limitation on the scope thereof. Parts and percentages used throughout the specification and claims are by weight unless otherwise indicated.

EXAMPLE 1

To a reaction vessel, immersed in a cold well, equipped as described above, was charged 121 ml of isobutylene, 174 ml of 1,3-butadiene (measured at $-100°$ C.), and 165 ml of a 1:1 (by volume) hexane/cyclohexane solvent mixture. Based on mole percent, the monomer charge consisted of 61.5 mole percent 1,3-butadiene and 38.5 mole percent isobutylene. The reaction mixture was cooled to $-100°$ C. Then 0.25 millimole (mmole) of methanol was added to the reactor. Following this addition, gaseous $BF_3$ was passed through the reaction mixture at the rate of 0.5 ml per minute for 60 minutes. The polymerization reaction was then terminated by adding 3 ml of methanol. The resultant copolymer solution was then stabilized with conventional antioxidant and coagulated into a large excess of methanol. The copolymer was subsequently dried in a vacuum oven at 60° C. The resulting gel-free copolymer (yield: 55 grams) had a number average molecular weight ($M_n$) determined by osmotic pressure of 117,000, a degree of unsaturation of 6.3 weight percent, a dilute solution viscosity (DSV) of 1.01 and an $M_w/M_n$ of 2.9.

EXAMPLE 2

To a reaction vessel immersed in a cold well, equipped as in Example 1, was charged 288 mls (50 mole percent) of 1,3-butadiene and 312 mls (50 mole percent) of isobutylene and 300 ml of a 1:1 (by volume) hexane/cyclohexane solvent mixture. The reaction mixture was then cooled to about $-103°$ C. Then, 0.05 mmole of methanol was added to the reactor. Following this addition, 22.8 ml (0.958 mmole) of gaseous $BF_3$ was passed through the reaction mixture at a rate of 0.5 ml per minute for the first 45 minutes and 0.1 ml for the next 3 minutes with the temperature being maintained in the range of $-103°$ C. to $-111°$ C. (The $BF_3$:ROH ratio was 19.2:1). The polymerization reaction was continued for an additional 15 minutes for a total time of 63 minutes. The polymerization reaction was then terminated by adding 3 ml of methanol. The resultant copolymer was then stabilized with a conventional antioxidant and coagulated in a large excess of methanol. The copolymer was subsequently dried in a vacuum at 60° C.

The resulting gel-free copolymer (yield: 76.9 grams) had a molecular weight $M_n$ of 186,000, a degree of unsaturation of 2.8 weight percent, a $M_w/M_n$ of 3.88 and a Tg of $-68°$ C.

It will be noted that the level of unsaturation is slightly below the minimum of 3.0 weight percent. This is considered to be within experimental error. Moreover, it is believed that if the conversion level were increased, the degree of unsaturation would be at 3.0 weight percent or above.

EXAMPLES 3–6

These Examples illustrate the preparation of butadiene-isobutylene copolymers by the process of the invention utilizing a monomer charge consisting of 55 mole percent 1,3-butadiene and 45 mole percent isobutylene. The procedure employed in preparing the copolymer was substantially the same as that utilized in Examples 1 and 2. The types and amounts of the various components, polymerization conditions and properties of the resultant copolymers are shown in Table I.

TABLE I

| Ex. No. | 3 | 4 | 5 | 6 |
|---|---|---|---|---|
| $C_4H_6$, mls at $-100°$ C. | 318 | 187 | 125 | 125 |
| $C_4H_8$, mls at $-100°$ C. | 282 | 77 | 110 | 110 |
| Hexane, mls at R.T.[(1)] | 150 | 126 | 90 | 90 |
| Cyclohexane, mls at R.T. | 150 | 126 | 90 | 90 |
| $BF_3$, mls (total)* | 18.0 | 7.5 | 7.5 | 7.5 |
| $BF_3$, mmole | 0.756 | 0.315 | 0.315 | 0.315 |
| Methanol, mmole | 0.10 | 0.10 | 0.20 | 0.10 |
| $BF_3$:ROH ratio | 7.56:1 | 3.15:1 | 1.58:1 | 3.15:1 |
| Temperature, °C. | −106 to −110 | −104 to −105 | −103 to −105 | −103 to −105 |
| Time, minutes | 90 | 30 | 30 | 30 |
| Yield, grams | 79.2 | 9.6 | 16.5 | 26.9 |
| $\eta$ [(2)] | 1.184 | .669 | .882 | .791 |
| $M_n$ | 119,000 | 98,300 | 131,000 | 123,000 |
| $M_w/M_n$ | 4.08 | 2.07 | 1.80 | 1.98 |
| Unsaturation, weight percent[(3)] | 4.1 | 3.2 | 2.5[(5)] | 3.6 |
| Percent gel | 0 | 0 | 0 | 0 |
| DSV[(4)] | 1.15 | — | — | — |
| Tg; °C. | −69 | −69 | — | — |

[(1)]R.T. = room temperature
[(2)]$\eta$ = intrinsic viscosity
[(3)]unsaturation is based on weight percent butadiene incorporated in copolymer
[(4)]DSV = dilute solution viscosity
[(5)]it is believed that at higher conversion this level would be at 3.0 or above, (see Ex. 6)
*flow rates for Examples 3-36 were variable as described in the specification above

EXAMPLES 7-25

These Examples illustrate the preparation of butadiene-isobutylene copolymers by the process of the invention utilizing a monomer charge consisting of 60 mole percent 1,3-butadiene and 40 mole percent isobutylene along with various types and amounts of ROH cocatalyst, various $BF_3$:ROH ratios and various types and amounts of aliphatic hydrocarbon solvents. The procedure employed in preparing the copolymers was substantially the same as that utilized in Examples 1 and 2. The types and amounts of the various components, polymerization conditions and properties of the resultant copolymers are shown in Tables II-V.

TABLE II

| Ex. No. | 7 | 8 | 9 | 10 | 11 |
|---|---|---|---|---|---|
| $C_4H_6$, mls at $-100°$ C. | 116 | 116 | 116 | 116 | 116 |
| $C_4H_8$, mls at $-100°$ C. | 84 | 84 | 84 | 84 | 84 |
| Cyclohexane, mls. at R.T. | 88 | 88 | 88 | — | 88 |
| Pentane, mls. at R.T. | 88 | 88 | 88 | 175 | 88 |
| $BF_3$, mls (total) | 75 | 30 | 30 | 30 | 30 |
| $BF_3$, mmoles | 3.15 | 1.26 | 1.26 | 1.26 | 1.26 |
| Methanol, mmole | 0.25 | 0.25 | 0.25 | 0.25 | 0.25 |
| $BF_3$:ROH ratio | 12.6:1 | 5.04:1 | 5.04:1 | 5.04:1 | 5.04:1 |
| Temperature, °C. | −108 to −110 | −109 to −110 | −107 to −110 | −109 to −110 | −109 to −110 |
| Time, minutes | 152 | 120 | 120 | 120 | 120 |
| Yield, grams | 39.5 | 15.1 | 37.2 | 23.8 | 32.3 |
| $\eta$ | .605 | .776 | .661 | .786 | .886 |
| $M_n$ | 61,000 | 122,000 | 76,600 | 106,000 | 103,000 |
| $M_w/M_n$ | 3.38 | 2.09 | 3.56 | 2.65 | — |
| Unsaturation, wt. % | 9.7 | 4.6 | 7.8 | 4.6 | 6.0 |
| Percent gel | 0 | 0 | 0 | 0 | 0 |
| DSV | .73 | .92 | .83 | .87 | .91 |

TABLE III

| Ex. No. | 12 | 13 | 14 | 15 | 16 |
|---|---|---|---|---|---|
| $C_4H_6$, mls at $-100°$ C. | 50 | 174 | 174 | 174 | 174 |
| $C_4H_8$, mls at $-100°$ C. | 37 | 126 | 126 | 126 | 126 |
| Hexane, mls at R.T. | 38.5 | 113 | 113 | 113 | 113 |
| Cyclohexane, mls at R.T. | 38.5 | 113 | 113 | 113 | 113 |
| $BF_3$, mls (total) | 6 | 30 | 30 | 15 | 45 |
| $BF_3$, mmoles | 0.252 | 1.26 | 1.26 | 0.63 | 1.89 |
| Methanol, mmole | 0.1 | 0.25 | 0.50 | 0.25 | 0.25 |
| $BF_3$:ROH ratio | 252:1 | 5.04:1 | 2.52:1 | 2.52:1 | 7.56:1 |
| Temperature, °C. | −104 to −110 | −110 to −112 | −109 to −111 | −109 to −111 | −109 to −111 |
| Time, minutes | 120 | 90 | 90 | 90 | 90 |
| Yield, grams | 13.6 | 36 | 37 | 28 | 42 |
| $\eta$ | .732 | .862 | .904 | 1.01 | .879 |
| $M_n$ | 104,000 | 131,000 | 124,000 | 184,000 | 131,000 |
| $M_w/M_n$ | 2.09 | 2.58 | 2.48 | 1.73 | 2.21 |
| Unsaturation, wt. percent | 4.3 | 4.1 | 5.0 | 2.3** | 4.1 |
| Percent gel | 0 | 0 | 0 | 0 | 0 |
| DSV | .86 | 1.0 | 1.1 | 1.1 | .98 |

**(low unsaturation level is believed due to relatively low conversion; note Example 14 which was run under basically the same conditions with the same overall $BF_3$:ROH ratio reaches an unsaturation level of 5.0% at higher conversion).

TABLE IV

| Ex. No. | 17 | 18 | 19 | 20 |
|---|---|---|---|---|
| $C_4H_6$, mls at $-100°$ C. | 203 | 348 | 116 | 116 |
| $C_4H_8$, mls at $-100°$ C. | 147 | 252 | 84 | 84 |
| Hexane, mls at R.T. | 100 | 150 | 88 | 88 |
| Cyclohexane, mls. at R.T. | 100 | 150 | 88 | 88 |
| $BF_3$, mls (total) | 31.2 | 52.5 | 9.0 | 20 |
| $BF_3$, mmoles | 1.31 | 2.21 | .378 | .84 |
| Methanol, mmole | 0.4 | 0.5 | 0.25 | 0.25 |
| $BF_3$:ROH ratio | 3.28:1 | 4.41:1 | 1.51:1 | 3.36:1 |
| Temperature, °C. | −115 to −116 | −110 to −112 | −110 | −108 to −110 |
| Time, minutes | 120 | 150 | 90 | 100 |
| Yield, grams | 40.1 | 96.8 | 11.9 | 28.4 |
| $\eta$ | 1.094 | .82 | 1.07 | .914 |
| $M_n$ | 180,000 | 96,000 | 187,000 | 120,000 |
| $M_w/M_n$ | 1.90 | 3.08 | 1.56 | 2.57 |
| Unsaturation, wt. % | 3.8 | 5.5 | 3.3 | 4.4 |
| Percent gel | 0 | 0 | 0 | 0 |
| DSV | .97 | .97 | 1.04 | .98 |

TABLE V

| Ex. No. | 21 | 22 | 23 | 24 | 25 |
|---|---|---|---|---|---|
| $C_4H_6$, mls at $-100°$ C. | 174 | 174 | 174 | 696 | 696 |
| $C_4H_8$, mls at $-100°$ C. | 126 | 126 | 126 | 504 | 504 |
| Hexane, mls at R.T. | 82.5 | 82.5 | 82.5 | 300 | 300 |
| Cyclohexane, mls at R.T. | 82.5 | 82.5 | 82.5 | 300 | 300 |
| $BF_3$, mls (total) | 30 | 30 | 30 | 38.5 | 40 |
| $BF_3$, mmoles | 1.26 | 1.26 | 1.26 | 1.62 | 1.68 |
| Methanol, mmole | 0.06 | — | — | — | — |
| t-butanol, mmole | — | .125 | .375 | — | — |
| n-propanol, mmole | — | — | — | .27 | .27 |
| $BF_3$:ROH ratio | 21:1 | 10:1 | 3.36:1 | 6:1 | 6.2:1 |
| Temperature, °C. | −110 | −108 to −110 | −109 to −110 | −107 to −110 | −108 to −110 |
| Time, minutes | 120 | 120 | 104 | 83 | 80 |
| Yield, grams | 28.4 | 40.1 | 26.7 | 178 | 180 |
| $\eta$ | .829 | .709 | .799 | — | — |
| $M_n$ | 102,000 | 88,400 | 113,000 | 113,000 | 91,400 |
| $M_w/M_n$ | 2.69 | 2.17 | 1.87 | 1.94 | 2.06 |
| Unsaturation, | 5.3 | 4.6 | 3.1 | 3.7 | 3.9 |

TABLE V-continued

| Ex. No. | 21 | 22 | 23 | 24 | 25 |
|---|---|---|---|---|---|
| wt. % | | | | | |
| Percent gel | 0 | 0 | 0 | 0 | 0 |
| DSV | .90 | .71 | — | .71 | .75 |

EXAMPLES 26-28

These Examples illustrate the preparation of butadiene-isobutylene copolymers by the process of the invention utilizing a monomer charge consisting of 65 mole percent 1,3-butadiene and 35 mole percent isobutylene. The procedure employed in preparing the copolymers was substantially the same as that utilized in Examples 1 and 2. The types and amounts of the various components, polymerization conditions and properties of the resultant copolymers are shown in Table VI.

TABLE VI

| Ex. No. | 26 | 27 | 28 |
|---|---|---|---|
| $C_4H_6$, mls at $-100°$ C. | 132 | 125 | 441 |
| $C_4H_8$, mls at $-100°$ C. | 77 | 73 | 259 |
| Hexane, mls at R.T. | 103 | 108 | 175 |
| Cyclohexane, mls at R.T. | 103 | 108 | 175 |
| $BF_3$, mls (total) | 7.5 | 7.5 | 50 |
| $BF_3$, mmoles | 0.315 | 0.315 | 2.10 |
| Methanol, mmole | 0.1 | 0.1 | 0.75 |
| $BF_3$:ROH ratio | 3.15:1 | 3.15:1 | 2.8:1 |
| Temperature, °C. | $-104$ to $-105$ | $-104$ to $-105$ | $-112$ to $-116$ |
| Time, minutes | 30 | 30 | 150 |
| Yield, grams | 4.2 | 4.8 | 61.0 |
| η | .579 | .568 | 1.06 |
| $M_n$ | 94,000 | 81,800 | 125,000 |
| $M_w/M_n$ | 2.26 | 2.19 | 2.99 |
| Unsaturation, wt. % | 5.0 | 5.8 | 5.9 |
| Percent gel | — | — | 0 |
| DSV | — | — | 1.19 |
| Tg, °C. | $-68.5$ | — | $-67$ |

EXAMPLES 29-32

These Examples illustrate the preparation of butadiene-isobutylene copolymers by the process of the invention utilizing a monomer charge consisting of 70 mole percent 1,3-butadiene and 30 mole percent isobutylene. The procedure employed in preparing the copolymers was substantially the same as that utilized in Examples 1 and 2. The types and amounts of the various components, polymerization conditions and properties of the resultant copolymer are shown in Table VII.

TABLE VII

| Ex. No. | 29 | 30 | 31 | 32 |
|---|---|---|---|---|
| $C_4H_6$, mls at $-100°$ C. | 408 | 213 | 213 | 204 |
| $C_4H_8$, mls at $-100°$ C. | 192 | 99 | 99 | 96 |
| Hexane, mls at R.T. | 200 | — | 82.5 | 100 |
| Cyclohexane, mls at R.T. | 200 | 125 | 82.5 | 100 |
| $BF_3$, mls (total) | 73 | 50 | 15.7 | 33.3 |
| $BF_3$, mmoles | 3.07 | 2.1 | 0.66 | 1.4 |
| Methanol, mmole | — | 0.5 | — | — |
| n-Propanol, mmoles | 1.0 | — | — | 0.4 |
| Trifluoroethanol, mmole | — | — | 0.5 | — |
| $BF_3$:ROH ratio | 3.07:1 | 4.2:1 | 1.3:1 | 3.5:1 |
| Temperature, °C. | $-113$ to $-120$ | $-105$ | $-120$ | $-120$ |
| Time, minutes | 90 | 60 | 40 | 88 |
| Yield, grams | 102.1 | 17.1 | 41.2 | 52.0 |
| η | .905 | .548 | .829 | .997 |
| $M_n$ | 81,000 | 79,000 | 70,300 | 83,400 |
| $M_w/M_n$ | 3.59 | 2.57 | 5.57 | 3.00 |

TABLE VII-continued

| Ex. No. | 29 | 30 | 31 | 32 |
|---|---|---|---|---|
| Unsaturation, wt. % | 11.8 | 6.6 | 15.4 | 10.7 |
| Percent gel | 0 | 0 | 0 | 0 |
| DSV | 1.01 | .65 | .88 | .98 |
| Tg, °C. | $-66$ | — | — | — |

EXAMPLES 33-36

These Examples illustrate the preparation of butadiene-isobutylene copolymers by the process of the invention utilizing a monomer charge consisting of 75 mole percent 1,3-butadiene and 25 mole percent isobutylene. The procedure employed in preparing the copolymers was substantially the same as that utilized in Examples 1 and 2. The types and amounts of the various components, polymerization conditions and properties of the resultant copolymers are shown in Table VIII.

TABLE VIII

| Ex. No. | 33 | 34 | 35 | 36 |
|---|---|---|---|---|
| $C_4H_6$, mls at $-100°$ C. | 220 | 220 | 214 | 257 |
| $C_4H_8$, mls at $-100°$ C. | 80 | 80 | 77 | 93 |
| Hexane, mls at R.T. | 88 | 100 | 63 | 100 |
| Cyclohexane, mls at R.T. | 88 | 100 | 63 | 100 |
| $BF_3$, mls (total) | 9.5 | 30 | 7.5 | 31.2 |
| $BF_3$, mmoles | 0.40 | 1.26 | 0.315 | 1.31 |
| Methanol, mmole | — | — | 0.1 | 0.4 |
| n-Propanol, mmole | — | 0.4 | — | — |
| Trifluoroethanol, mmole | 0.5 | — | — | — |
| $BF_3$:ROH ratio | 0.8:1 | 3.15:1 | 3.15:1 | 3.28:1 |
| Temperature, °C. | $-104$ to $-120$ | $-120$ | $-104$ to $-105$ | $-106$ |
| Time, minutes | 23 | 60 | 30 | 120 |
| Yield, grams | 20.3 | 34.4 | 6.2 | 23.3 |
| η | .735 | .847 | .576 | .501 |
| $M_n$ | 76,400 | 74,500 | 71,300 | 62,600 |
| $M_w/M_n$ | 3.55 | 2.80 | 1.93 | 2.72 |
| Unsaturation, wt. % | 15.8 | 12.3 | 8.4 | 10.6 |
| Percent gel | 0 | 9.3 | — | 0 |
| DSV | .71 | .79 | — | .56 |
| Tg, °C. | — | — | $-69.5$ | $-68.5$ |

In addition to the above Examples, a number of screening experiments were run utilizing various ROH cocatalysts.

EXAMPLES A-P

In these screening experiments, a blend consisting of 5.09 lbs. hexane, 6.01 lbs. cyclohexane, 7.58 lbs. 1,3-butadiene and 5.39 lbs. isobutylene was first prepared. (The monomer charge consisted of 60 mole percent 1,3-butadiene and 40 mole percent isobutylene). Then, in each experimental example, 120 grams of the blend were charged to a 10-ounce beverage bottle. The bottle and contents were cooled to $-110°$ C. following which the bottle was opened. To the bottle was then added 0.125 mmole of the ROH cocatalyst followed by the addition of 10 mls of $BF_3$ gas (0.42 mmole) at the rate of 5 mls per minute for 2 minutes. (The $BF_3$:ROH molar ratio in all of the examples except for the control was 3.36:1). The bottle was kept in the $-110°$ C. bath for 2 hours without stirring and the polymerization then terminated with excess methanol. For comparative purposes, a control run was made utilizing the same conditions and the same components except that no ROH cocatalyst was employed (i.e., the sole catalyst was $BF_3$). In these screening experiments, it was assumed that the reaction temperature would not significantly exceed −110° C. However in a later experiment using methanol as a cocatalyst, it was determined that a temperature exotherm of > than 30° C. was occurring. The various ROH cocatalysts and properties of the resultant copolymers are shown in Table IX.

TABLE IX

| Example No. | ROH | Yield (grams) | $\eta$ | Unsaturation Weight, % |
|---|---|---|---|---|
| A | none (control) | 1.4 | .466 | 5.9 |
| B | methanol | 20.5 | .422 | 12.8 |
| C | ethanol | 21.5 | .468 | 12.5 |
| D | n-propanol | 22.6 | .387 | 10.7 |
| E | allyl alcohol | 18.5 | .454 | 8.2 |
| F | propargyl alcohol | 9.0 | .452 | 7.9 |
| G | isopropanol | 18.5 | .520 | 7.1 |
| H | t-butanol | 10.6 | .649 | 4.6 |
| I | n-butanol | 23.9 | .420 | 12.4 |
| J | isobutanol | 22.0 | .432 | 9.8 |
| K | sec-butanol | 18.0 | .481 | 6.9 |
| L | n-amyl alcohol | 21.9 | .385 | 13.2 |
| M | isoamyl alcohol | 24.9 | .376 | 12.9 |
| N | n-octanol | 18.6 | .480 | 7.8 |
| O | phenol | 14.6 | .371 | 11.8 |
| P | trifluoroethanol | 24.6 | .478 | 19.2 |

As indicated above, the temperatures in these screening experiments varied from the desired −110° C. level due to the occurrence of a significant exotherm. In this regard, it should be noted that the screening experiments were conducted without the benefit of stirring during polymerization and with relatively rapid addition of $BF_3$ to the reaction system. Nevertheless, as can be seen from the data, the butadiene-isobutylene copolymers produced during these screening experiments contained significant amounts of unsaturation. Moreover, applicants believe that with proper temperature control (obtainable by slower metering of $BF_3$ to the reaction zone, i.e., 0.1 to 1.0 mls per minute, and adequate stirring during polymerization) copolymers having molecular weights analogous to those obtained under the substantially isothermal conditions utilized in most of Examples 1–36 may be obtained using the above alcohols as cocatalysts. In this regard, it should be noted that a number of these alcohols (i.e., methanol, n-propanol, t-butanol and trifluoroethanol) were in fact tested under such conditions.

What is claimed is:

1. A process for preparing substantially gel-free copolymers of butadiene and isobutylene, having a number average molecular weight of from about 50,000 to about 200,000 and a degree of unsaturation of from about 3 weight percent to about 25 weight percent, which comprises the steps of:

(a) preparing a reaction mixture by dissolving from 50 to 80 mole percent of 1,3-butadiene and from 50 to 20 mole percent of isobutylene monomers in an aliphatic hydrocarbon solvent or a mixture of aliphatic hydrocarbon solvents; and (b) polymerizing the monomers in the reaction mixture at a temperature of below −95° C. in the presence of a catalyst system consisting of a $BF_3$ catalyst and an ROH cocatalyst, wherein R is an organic radical selected from the group consisting of alkyl, cycloalkyl, substituted alkyl, aryl and substituted aryl groups, said alkyl groups containing from 1 to 20 carbon atoms; and wherein the molar ratio of $BF_3$ to ROH is from about 1:1 to about 22:1.

2. The process of claim 1 wherein the copolymer has a number average molecular weight of at least 50,000 and a degree of unsaturation of at least 6.0 weight percent.

3. The process of claim 2 wherein the copolymer has a degree of unsaturation of from 6.0 to 12.0 mole percent.

4. The process of claim 1 wherein the reaction mixture contains 60 mole percent 1,3-butadiene and 40 mole percent isobutylene.

5. The process of claim 1 wherein said aliphatic hydrocarbon solvent is cyclohexane or hexane.

6. The process of claim 1 wherein said mixture of aliphatic solvents is a mixture of a linear aliphatic hydrocarbon solvent and a cycloaliphatic hydrocarbon solvent.

7. The process of claim 6 wherein said mixture is a mixture of hexane and cyclohexane.

8. The process of claim 6 wherein the volume ratio of linear aliphatic hydrocarbon solvent to cycloaliphatic hydrocarbon solvent is from 1:4 to 4:1.

9. The process of claim 1 wherein the catalyst consists of a $BF_3$ catalyst and an ROH cocatalyst in which R is an alkyl group containing from 1 to 10 carbon atoms.

10. The process of claim 1 wherein the catalyst system consists of $BF_3$ and methanol.

11. The process of claim 1 wherein the catalyst system consists of $BF_3$ and trifluoroethanol.

12. The process of claim 1 wherein the catalyst system consists of $BF_3$ and n-propanol.

13. The process of claim 1 wherein the catalyst system consists of $BF_3$ and t-butanol.

14. The process of claim 1 wherein the catalyst system consists of a $BF_3$ catalyst and an ROH cocatalyst and the molar ratio of $BF_3$:ROH is about 3:1.

* * * * *